Figure 1:
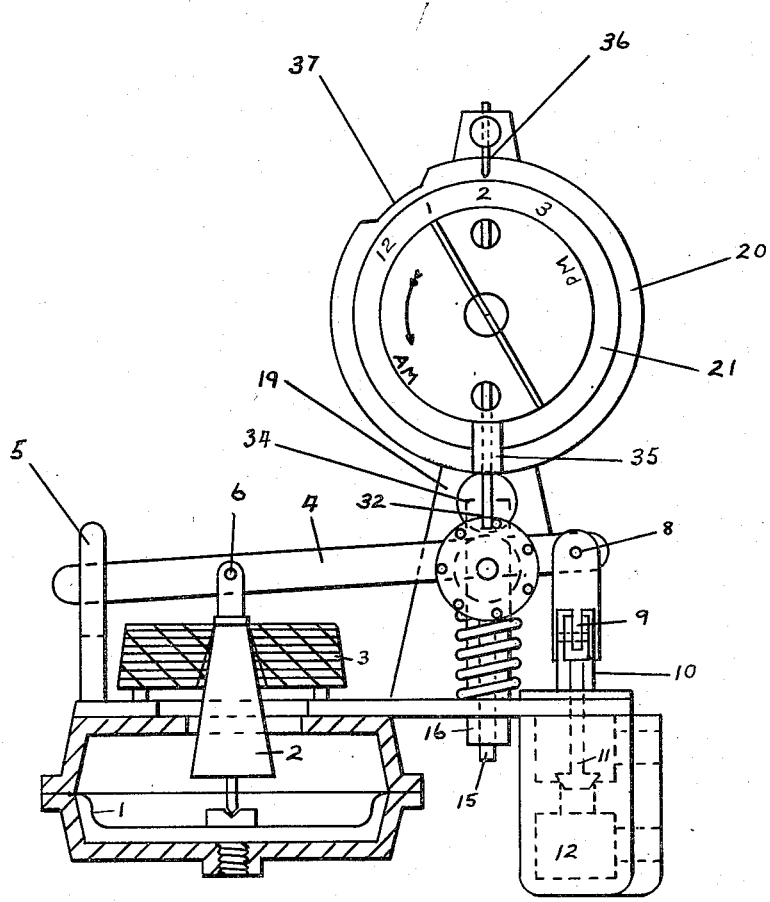

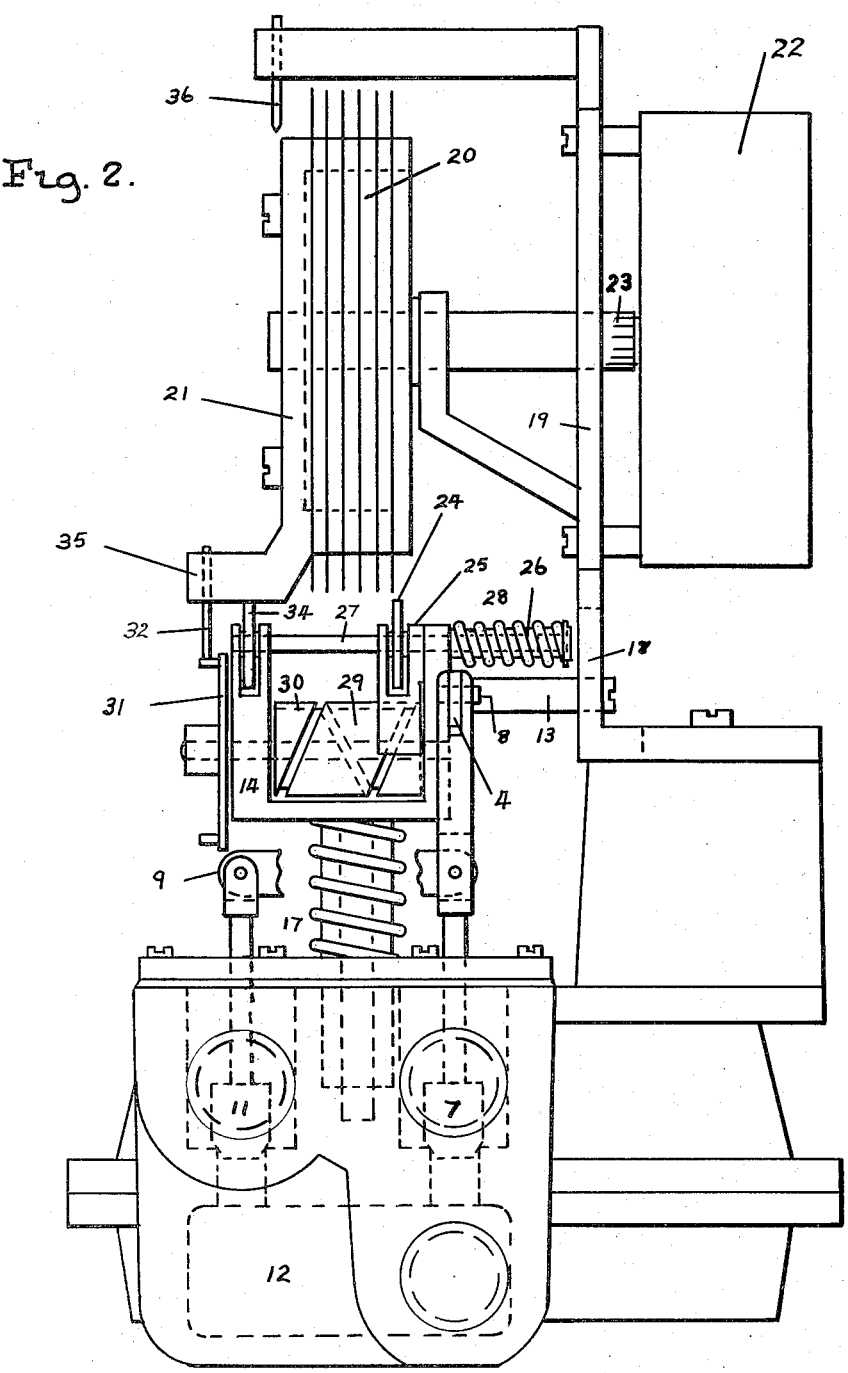

Patented Dec. 8, 1953

2,661,577

UNITED STATES PATENT OFFICE 2,661,577

AUTOMATIC PRESSURE CHANGER FOR GAS REGULATORS

Thomas A. Hanson, Woodstock, Ontario, Canada

Application July 20, 1950, Serial No. 174,892

3 Claims. (Cl. 50—11)

This invention relates to an improved automatic loading auxiliary, or pilot, regulator for the purpose of controlling, and altering at predetermined times, the outlet pressure of a district gas regulator.

One such device is known and is described in British Patent No. 535,655, dated September 13, 1939, and granted to Thomas Alec Hanson and Bryan Domkin Company Limited.

In this device a cam, operating through a lever, raises or lowers a wedge between two arms of an articulated, or two part, lever, both parts of which have one common pivot, the two arms being held against the wedge of a spring. The lever connects with a valve and with a diaphragm. The raising of the wedge causes in effect a bending of the lever, resulting in an opening of the control valve of the automatic regulator, and a consequent increase in the outlet pressure of the district gas regulator. A number of weights, arranged to be consecutively picked up as the diaphragm of the device rises, check the latter from rising too far and the valve and the diaphragm thus attain and retain their correct relative positions throughout the period during which the cam is raising the wedge.

A further feature of the device is the use of seven daily cams formed into a helical unit which is arranged to wind itself along its spindle, as it revolves once daily, by the insertion of a stationary member within the formed helical groove.

Such construction however, embodying as it does three component levers and a wedge, all of which have to be related to the cam contour, is an indirect and comparatively expensive method of attaining the object in view, particularly so since an unusually powerful clock is necessary to raise the wedge, which has to be weighted against the thrust of the spring closed lever arms.

It is necessary also to reset the helical cam unit at the end of a weekly run, since no resetting means are employed.

I have found that a simpler and better construction embodies the use of a single lever which connects with the valve and with the diaphragm, and which has its fulcrum movable in conformity with the contour of the cam face.

A number of consecutively picked up weights, similar to those in the described and known device, are employed in my construction of an automatic pressure changer.

Seven daily cams, assembled as one unit are also employed, but this unit is arranged to be self-resetting, so that, by the use of an electrically driven clock, weekly visits to a district regulator are unnecessary, so far the automatic pressure changer is concerned.

A further feature of my invention is the use of two side by side, and linked, control valves, the object of such feature being to speed up either the building up or the escape of the loading pressure in a low pressure district regulator, thus obtaining a quicker response of the latter to pressure fluctuations.

In drawings which illustrate embodiments of the invention Figure 1 is a front elevation, partly in section, of the device.

Figure 2 is a side elevation of the same in which the disc weights shown in Figure 1 are not shown, and in which the valve link bar is shown as being broken and the link bar stanchion is removed.

The invention illustrated comprises a diaphragm 1 upon which rests a cone 2. A number of flat disc weights 3 are bored as a block to a wider angle than that of the cone so that they will be picked up one at a time by the cone as it rises, a small space then being left between each disc. A lever 4 slidable in a slotted guide 5 is connected to the cone by a pivot screw 6 and to one valve 7 by the pivot screw 8.

A link bar 9 pivoted upon a stanchion 10 connects the valve 7 with a second valve 11.

Each valve is provided with a sealing diaphragm, to prevent the escape of gas, such diaphragms being, however, not illustrated herein.

Both valve passages connect with a common chamber 12.

A lever fulcrum pin 13 is fixed to the body component 14 of a cam follower assembly, the body component being formed with a stem 15 which is slidable in guide 16, and a spring 17 keeps the assembly against the cam. The fulcrum pin 13 serves also as a guide to prevent rotation of the follower assembly, the pin being slidable in a slot 18 formed in a clock mounting bracket 19.

A cam unit 20 comprises seven cams and space washers mounted upon a drum and clamped together by a clamping plate 21, the unit being rotatably mounted upon the clock mounting bracket and being driven by a clock 22 through a frictional coupling 23.

A cam follower roller 24 is mounted in a saddle shaped carriage 25 provided with a tubular stem 26 through which passes a spindle 27.

A return spring 28 is fitted upon the tubular stem 26.

The roller carriage 25 is provided with a peg which engages with the thread formed upon a lead screw 29.

An axially situated groove 30 is formed upon the lead screw, connecting the starting point of the thread with the point reached at the end of one revolution of the lead screw.

The lead screw is rotated one seventh of a revolution during the cam changing period by means of a pin wheel 31 (or alternatively of a star wheel) which is engaged for a period once daily by a striking peg 32.

The daily partial revolution of the lead screw is thus arranged to move the roller carriage sufficiently to bring the follower roller 24 underneath a different cam each day of the week, and at the end of the seventh day the roller carriage is moved slightly farther along its spindle until the lead screw engagement peg reaches the axial groove when the roller carriage is returned to its starting point by the spring 28.

An auxiliary roller 34, engaging with a projecting segment 35 formed upon the clamping plate takes over the function of the cam follower roller during the changeover period, the cam edges being relieved so that the follower roller may easily pass underneath the cams.

A pointer 36 is provided for the purpose of timing the device, No. 37 shows a cam indent.

The operation of the automatic pressure changer is as follows:

At periods of normal demand for gas the automatic pressure changer operates in the same manner as an ordinary auxiliary or pilot regulator, being only constructionally different from the latter, and the diaphragm of the device is weighted with an ordinary block weight of such value that with the lowest outlet pressure on the schedule operating underneath the diaphragm there is sufficient force to lift the cone and the top one only of the multiple disc weights.

The remainder of the weights are therefore left in position to govern the device throughout its pressure increase range, as the cone rises.

During the lowest pressure period an unformed part of the edge of the cam is in position against the follower roller.

When a formed part of the cam moves around to the follower roller the follower assembly, carrying the lever fulcrum, moves upwards, opening the valve 7.

The outlet pressure is thereby increased until eventually it is sufficient to cause the cone to lift another disc weight. This process continues until the deepest part of the cam indent is reached by the follower roller. The depth of the cam form required to give a pre-determined pressure is related to the distance travelled by the cone from the point at which it picks up the second weight to the point at which it picks up the last one, and it is also related to the positioning of the lever pivotal points. For instance, if the extensible distance of the weights is one inch, and the distance from the lever fulcrum to the valve pivotal point is one third of the distance from the fulcrum to the cone pivotal point, then the formed depth of the cam required to obtain a pressure increase equal to the full value of the whole of the weights will be slightly more than one quarter inch, the excess over one quarter inch being necessary since the valve is necessarily open slightly more to obtain the higher outlet pressure.

Referring to the two valve feature of the invention, the object of which has been stated, it should be mentioned that in low pressure regulators of the gas pressure loading type it is common to use a single valve auxiliary regulator to control the admission of the loading pressure, and to use a fixed orifice to permit the escape of gas either to the outlet side or, as in some cases, to atmosphere.

In my device however one valve admits gas from the inlet supply to the common chamber 12, and the other valve allows the escape of gas to the outlet main, the differential pressure in the common chamber being used to load the district regulator.

Thus, since one valve opens as the other closes, the differential pressure will be altered to suit the requirements of the district regulator much more quickly than by the use of a single valve and a fixed orifice.

The embodiments of the invention in which an exclusive property privilege is claimed are defined as follows:

1. A combination comprising a valve to control the pressure of gas in the controlling chamber of a regulator, a valve actuating diaphragm operative by pressure from the outlet side of said regulator, a stack of disc form weights conically bored through the center, a cone, mounted upon the diaphragm, and so formed as to be able to pick up or set down the disc weights consecutively as pressure under the diaphragm is altered, a lever which links the cone to the valve, and which is pivoted upon a movable member, a cam follower roller mounted upon said member, a spring tending to move said movable member and arranged to keep said follower roller in contact with a cam, said cam being of disc form and having formed upon it peripheral indents for the purpose of allowing the movable member to be moved in a valve opening direction through the medium of the spring when the follower roller enters an indent, and a clock to rotate the cam.

2. A mechanism as defined in claim 1 in which seven successively selected cams are used, the selector mechanism comprising a drum containing the cams suitably spaced from each other, a carriage arranged to move the cam follower roller from one cam to another, a leadscrew adapted to engage with the carriage, an axially directed slot along the leadscrew connecting the beginning and end of its thread, a pin wheel adapted to turn the leadscrew, and a striking peg mounted upon the cam drum end and adapted to turn the pin wheel one seventh of a revolution per day.

3. A mechanism as defined in claim 1 in which two valves are used both being connected by a link lever so that one valve closes as the other is opened by the movement of the diaphragm.

THOMAS A. HANSON.

References Cited in the file of this patent

UNITED STATES PATENTS

| Number | Name | Date |
| --- | --- | --- |
| 193,515 | Isbell | July 24, 1877 |
| 216,556 | Cowan | June 17, 1879 |
| 359,673 | Grovesteen | Mar. 23, 1887 |
| 1,301,405 | Dexter | Apr. 22, 1919 |

FOREIGN PATENTS

| Number | Country | Date |
| --- | --- | --- |
| 447,996 | Great Britain | of 1936 |